United States Patent
Manes et al.

[11] Patent Number: 6,155,659
[45] Date of Patent: Dec. 5, 2000

[54] RECEIVER AND MAGAZINE ASSEMBLY FOR STORAGE LIBRARY SYSTEM

[75] Inventors: Kenneth Lee Manes, Westminster; Donald Robert Manes, Arvada, both of Colo.

[73] Assignee: Storage Technology Corporation, Louisville, Colo.

[21] Appl. No.: 09/544,043

[22] Filed: Apr. 6, 2000

Related U.S. Application Data

[63] Continuation of application No. 09/178,454, Oct. 23, 1998, abandoned.

[51] Int. Cl.[7] .................................................. E05B 65/46
[52] U.S. Cl. ............................................. 312/216; 312/9.48
[58] Field of Search ................................. 312/215, 216, 312/217, 221, 222, 107.5, 223.1, 223.2, 9.47, 9.48, 9.57, 9.63, 9.64, 9.29, 9.38, 333; 364/478.01, 478.02; 360/98.06, 92; 414/331

[56] References Cited

U.S. PATENT DOCUMENTS

| | | | |
|---|---|---|---|
| 3,357,762 | 12/1967 | Forsyth ..................................... | 312/215 |
| 3,904,259 | 9/1975 | Hoffman et al. ................... | 312/9.57 X |
| 4,545,045 | 10/1985 | Baer et al. . | |
| 4,984,106 | 1/1991 | Herger et al. ............................. | 360/92 |
| 5,277,534 | 1/1994 | Anderson et al. . | |
| 5,576,911 | 11/1996 | Porter .................................... | 360/98.06 |
| 5,607,275 | 3/1997 | Woodruff et al. ........................ | 414/331 |
| 5,659,440 | 8/1997 | Acosta et al. ............................. | 360/92 |
| 5,673,983 | 10/1997 | Carlson et al. .......................... | 312/218 |
| 5,795,042 | 8/1998 | Todor ...................................... | 312/221 |
| 5,818,723 | 10/1998 | Dimitri ............................... | 364/478.02 |
| 5,833,331 | 11/1998 | Chang .................................. | 312/223.2 |

FOREIGN PATENT DOCUMENTS

| | | |
|---|---|---|
| 0 712 125 | 5/1996 | European Pat. Off. . |
| 0709840 | 5/1996 | European Pat. Off. . |
| 0 856 844 | 8/1998 | European Pat. Off. . |

*Primary Examiner*—Peter M. Cuomo
*Assistant Examiner*—James O. Hansen
*Attorney, Agent, or Firm*—Wayne P. Bailey

[57] ABSTRACT

A storage library system for storing cartridges having cartridge notches formed therein includes a receiver and magazine assembly. The receiver forms an opening therein and includes an actuator member. The magazine is adapted for engagement within the receiver opening. The magazine includes a plurality of cells formed therein for receiving the cartridges. The magazine includes a locking member engageable with the actuator member to hold the locking member longitudinally in place between locked and unlocked positions with respect to the notch of each cartridge for automatically locking and unlocking the cartridge in each of the plurality of cells as the magazine is longitudinally moved with respect to the receiver and the locking member.

10 Claims, 6 Drawing Sheets

RECEIVER AND MAGAZINE ASSEMBLY FOR STORAGE LIBRARY SYSTEM

This is a continuation of application Ser. No. 09/178,454 filed on Oct. 23, 1998 abandoned.

TECHNICAL FIELD

The present invention relates to a storage library system including a receiver adapted to receive a magazine populated with cartridges, wherein the cartridges are automatically locked within the magazine when the magazine is outside of the receiver, and are automatically unlocked for removal from the magazine when the magazine is inserted into the receiver.

BACKGROUND

Storage library systems are capable of storing and rapidly retrieving large quantities of information stored on storage media cartridges. Such storage library systems often use robotic mechanisms to improve the speed of information retrieval and the reliability of maintaining the storage library cartridge inventory. These robotic mechanisms typically comprise a hand mechanism positioned on a robotically movable arm. To retrieve information, the robotic arm is moved to position the hand near the inventory location of a desired media cartridge. The hand is then activated to grip the desired cartridge and remove it from the library inventory location. The robotic arm then moves to an appropriate position to further process the cartridge. In this manner, the robotic hand manipulates the cartridge for access to information stored on the cartridge.

Generally, the storage library system will include a plurality of stacks of cartridges which are accessible by means of the above-described robotic handling mechanism. Generally, the cartridges are stored within magazines having a plurality of cells formed therein for receiving the cartridges. The magazines are supported by a receiver in a manner such that the cartridges are exposed for retrieval by the robotic handling mechanism.

It is sometimes desirable to remove and install magazines as modular units in the storage library system for providing access to different types of information in groups. Accordingly, such magazines may be periodically removed from the storage library system while containing cartridges within the cells of the magazine. Accordingly, it is desirable to have the cartridges automatically locked within the magazine when the magazine is outside of the storage library system for handling, and further to have the cartridges automatically unlocked for removal from the cells as the magazine is inserted into the respective receiver.

U.S. Pat. No. 5,795,042 discloses a storage library system in which the cartridge cells are automatically unlocked as the magazine is inserted into the receiver. The present invention represents an improvement of the storage library system disclosed in U.S. Pat. No. 5,795,042 in that a locking mechanism of the magazine is held between locked and unlocked positions by an actuator member of the receiver as the magazine longitudinally moves with respect to the receiver.

SUMMARY OF THE INVENTION

Accordingly, the present invention provides a receiver and magazine assembly for a storage library system in which the cartridge cells are automatically locked when the magazine is outside of the receiver, and the cartridge cells become automatically unlocked as the magazine is inserted into the respective receiver for facilitating removal of the cartridges from the various cells.

More specifically, the present invention provides a storage library system for storing cartridges. Each cartridge has a notch formed therein. The system includes a receiver forming an opening therein and an actuator member. A magazine is adapted for engagement within the receiver opening. The magazine is provided with a plurality of cells formed therein for receiving the cartridges. The magazine includes a locking member engageable with the actuator member to hold the locking member between locked and unlocked positions with respect to the cartridge notches for automatically locking and unlocking the cartridge in each of the plurality of cells as the magazine is longitudinally moved with respect to the receiver.

Preferably, the receiver includes a guide channel and the actuator member includes an upper ledge formed within the guide channel. Preferably, the locking member includes a spring-biased, longitudinally slidable latch provided with a plurality of fingers extending therefrom for cooperation with the notch and a cartridge positioned in any of the plurality of cells. The locking member preferably further includes a boss at an end of the latch for engaging the upper ledge of the actuator member in the guide channel for holding the latch as the magazine is moved longitudinally with respect to the receiver.

Accordingly, an object of the present invention is to provide a receiver and magazine assembly for a storage library system in which the magazine cartridge cells are automatically locked when the magazine is outside the receiver, and become automatically unlocked as the magazine is inserted into the receiver in order to facilitate removal of the cartridges from the magazine cells.

The above object and other objects, features, and advantages embodiments of the present invention are readily apparent from the following detailed description of the best mode for carrying out the present invention when taken in connection with the accompanying drawings.

BEST MODES FOR CARRYING OUT THE INVENTION

Figure 1:
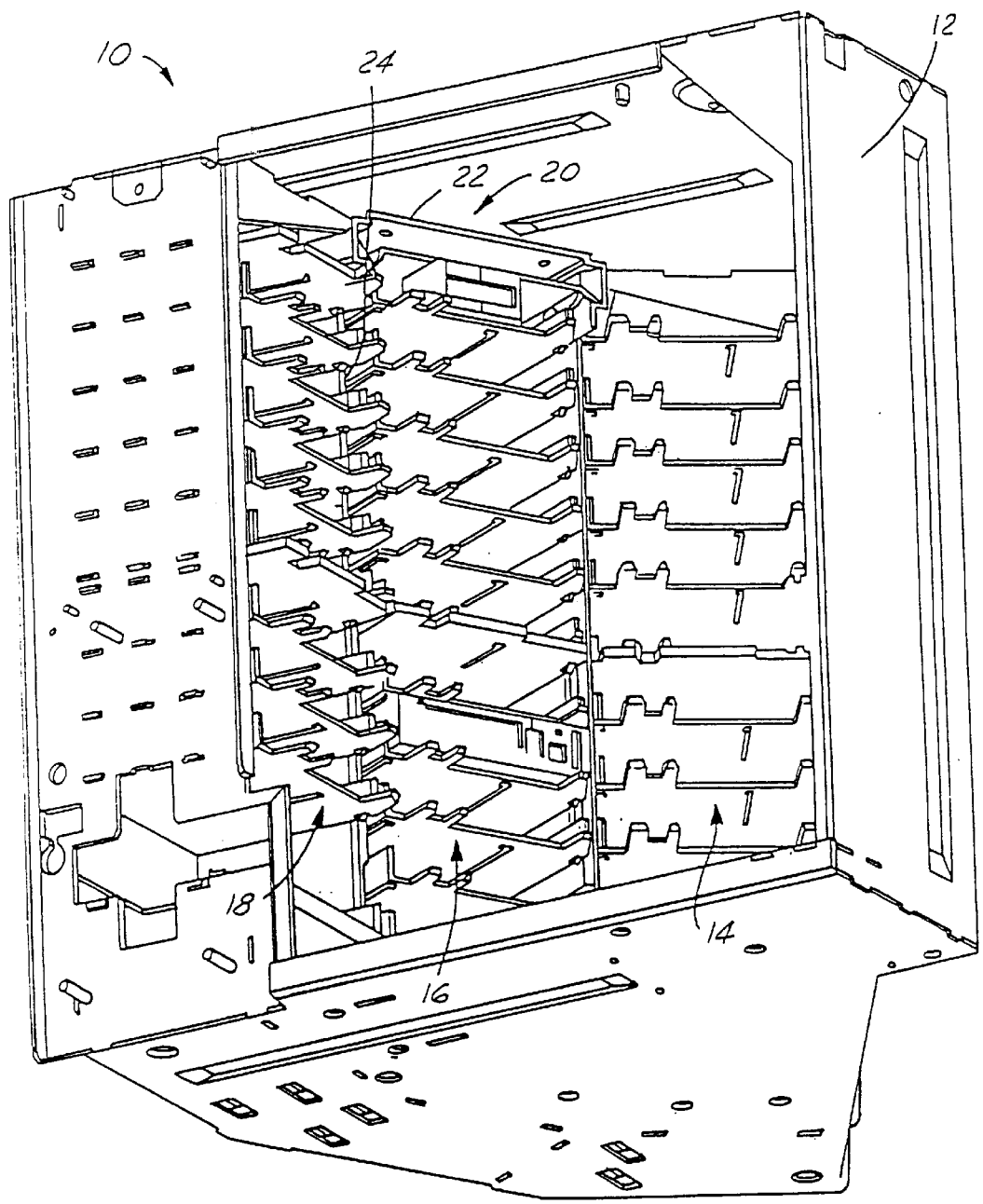
FIG. 1 shows a perspective view of a storage library system in accordance with the present invention.

Referring now to FIG. 1, a storage library system 10 is shown in accordance with the present invention. As shown, storage library system 10 includes an outer housing 12 which encloses a plurality of cartridge cell stacks 14, 16, and 18, which are configured for storing stacks of cartridges therein. At least one of cartridge cell stacks 14, 16, and 18 includes a receiver and magazine assembly 20. Receiver and magazine assembly 20 includes a receiver 22 adapted to removably receive a cartridge magazine 24.

Figure 2:
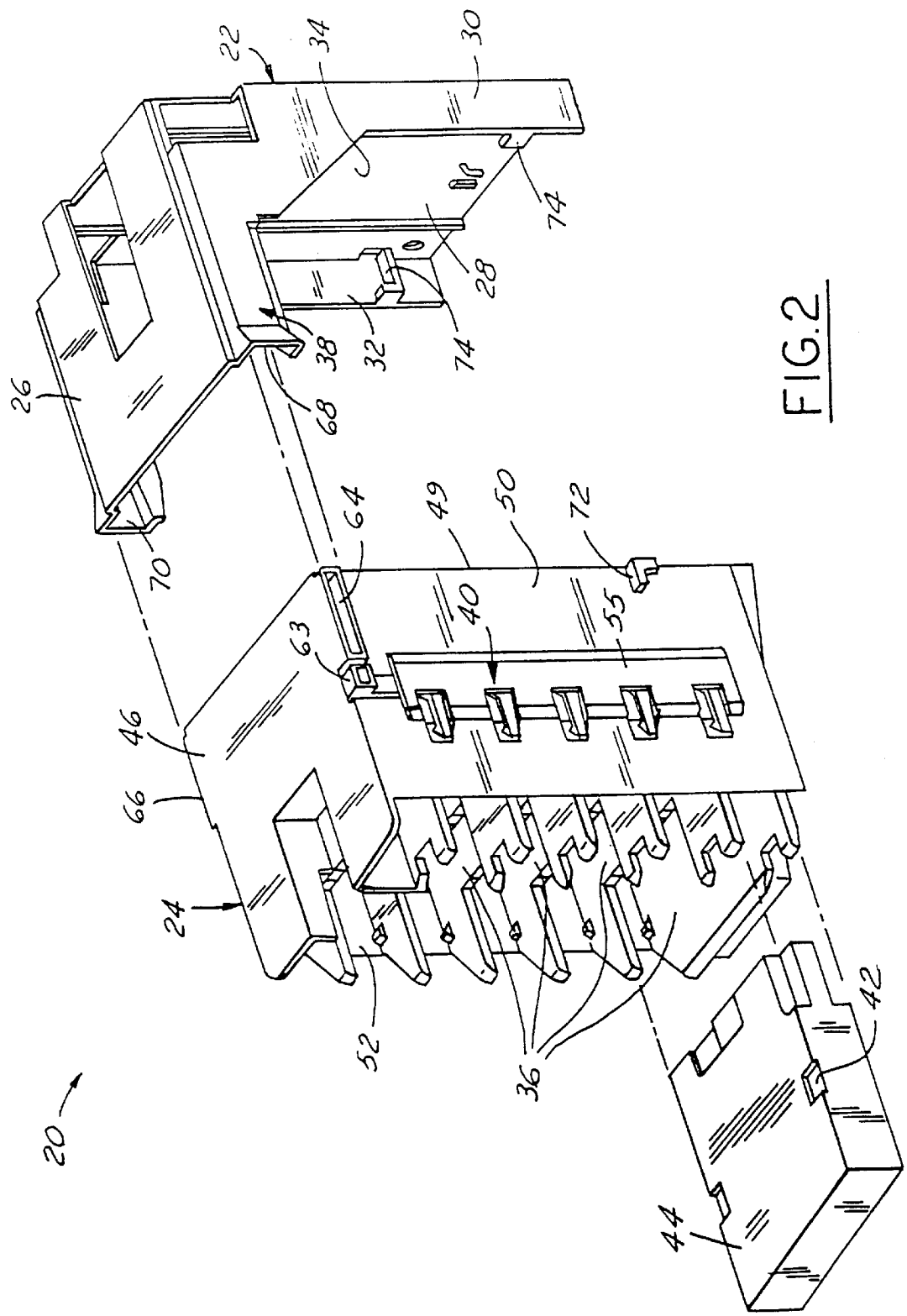
FIG. 2 shows a partially exploded perspective view of a receiver and magazine assembly in accordance with the present invention.
Figure 3:
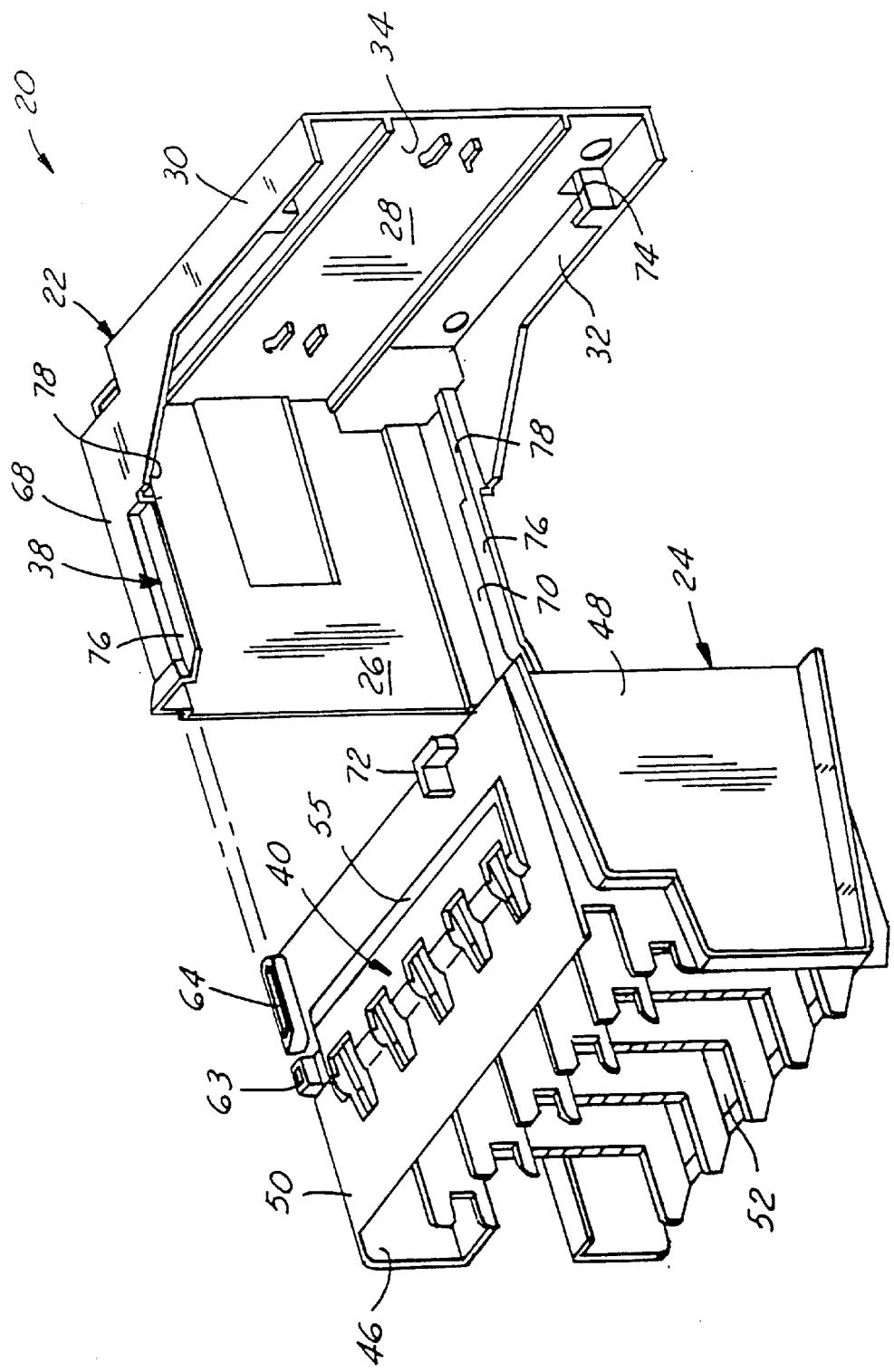
FIG. 3 shows a reverse partially exploded perspective view of the receiver and magazine assembly shown in FIG. 2.

Receiver and magazine assembly 20 is more clearly shown in FIGS. 2 and 3. As shown, receiver 22 includes a top portion 26, a rear surface 28, and a pair of legs 30 and 32 extending downward from top portion 26 and outward from rear surface 28, all of which cooperate to form an opening 34 for receiving magazine 24. Magazine 24 includes a top portion 46, a bottom portion 48, a rear portion 49, and a pair of side portions 50 and 52. Magazine 24 further includes a plurality of cells 36 formed therein for receiving cartridges.

Magazine 24 includes a pair of guide tracks 64 and 66 extending out from respective side portions 50 and 52 adjacent top portion 46. Receiver 24 provides a corresponding pair of guide channels 68 and 70 positioned at opposing sides of a longitudinal end thereof for receipt of the respective guide tracks 64 and 66. As magazine 24 is inserted into opening 34 of receiver 22, guide tracks 64 and travel into respective guide channels 68 and 70 until rear portion 49 of the magazine meets rear surface 28 of the receiver. Magazine 24 is then moved longitudinally downward with respect to top portion 26 of receiver 24 until tabs 72 provided on side portions 50 and 52 of the magazine bottom out in slots 74 provided on legs 30 and 32 of receiver 22.

Receiver 22 is provided with an actuator member 38 and magazine 24 is provided with a locking member 40 which is engageable with the actuator member to hold the locking member between locked and unlocked positions with respect to the cartridge notches as the magazine longitudinally moves within the receiver, such as notch 42 of cartridge 44. In this manner, cartridge 44 may be automatically locked and unlocked from cells 36 as magazine 24 is longitudinally moved with respect to receiver 22 for engaging actuator member 38 and locking member 40 (the operation of which is described below). Actuator member 38 of receiver 22 includes an upper ledge 76 and a lower ledge 78 formed as part of guide channel 68.

Figure 5:
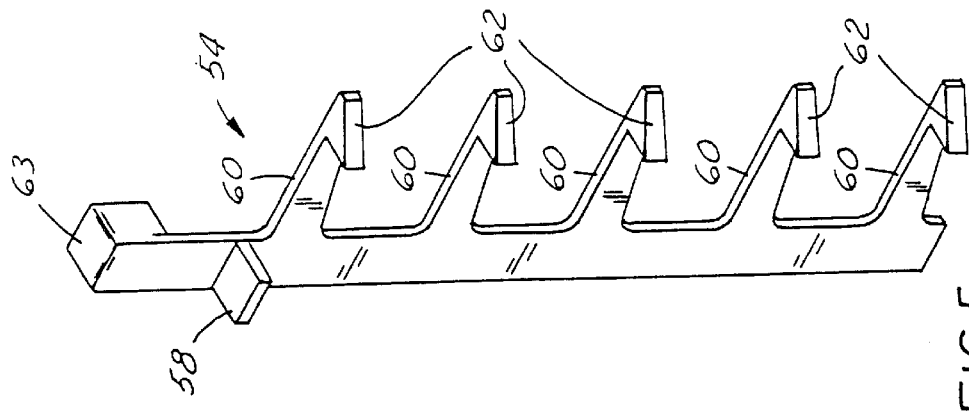
FIG. 5 shows a perspective view of the locking mechanism in accordance with the present invention.
Figure 4:
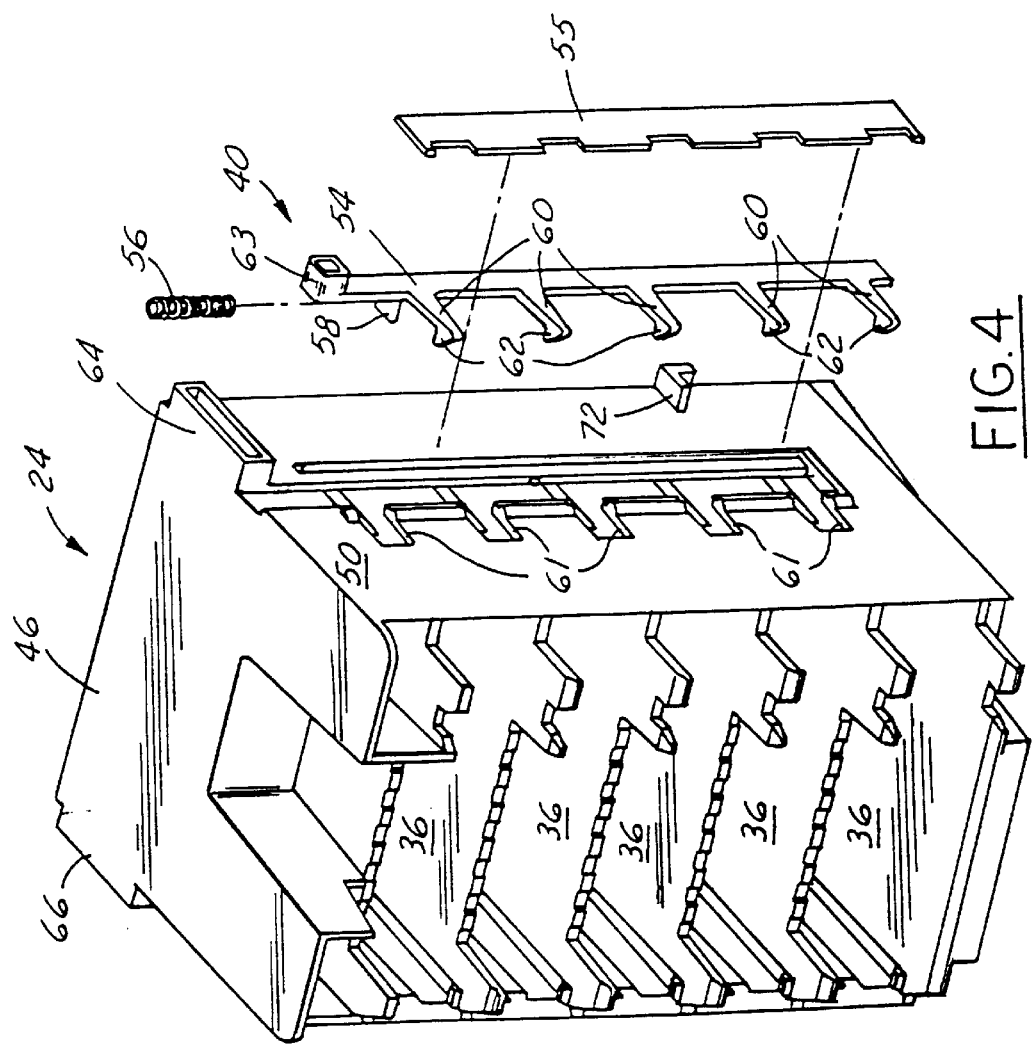
FIG. 4 shows an exploded view of the magazine of the receiver and magazine assembly shown in FIG. 2.

Referring now to FIGS. 4–5, with continual reference to FIGS. 2–3, locking member 40 includes a spring-biased, longitudinally slidable latch 54. Latch 54 is spring-biased with respect to top portion 46 of magazine 24 by means of a spring 56. Spring 56 extends between a platform 58 of latch 54 and a top portion 46 of magazine 24. Locking member 40 also includes a plurality of fingers 60 extending from latch 54. Fingers 60 each include a bent portion 62. Each bent portion 62 extends through an opening 61 corresponding with each cell 36 to cooperate with notch 42 of a cartridge 44 for locking the respective cartridge in the respective cell. A boss 63 is formed at one end of latch 54. Boss 63 is aligned with guide track 64 on side portion 50 such that as magazine 24 is inserted into opening 34 of receiver 22, the boss and guide track travel into guide channel 68. A latch retainer 55 holds latch 54 to side portion 50 of magazine 24.

Figure 7:
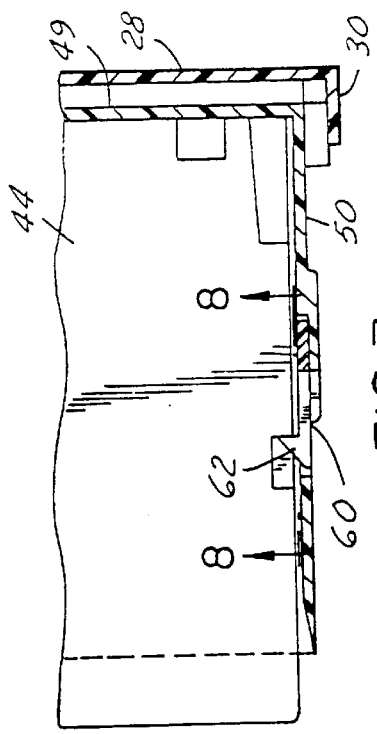
FIG. 7 shows a sectional view of the receiver and magazine assembly shown in FIG. 6 along the line 7—7.
Figure 8:
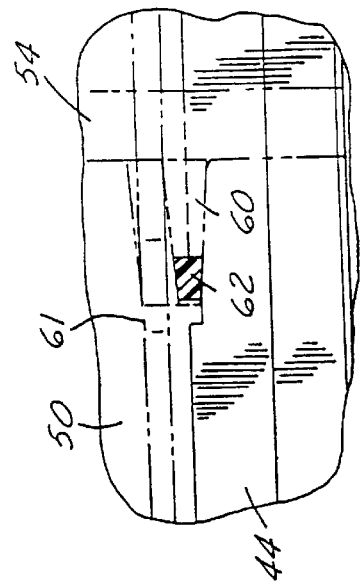
FIG. 8 shows a finger of the locking member engaged with a notch of a cartridge to lock the cartridge within a cell of the magazine.
Figure 6:
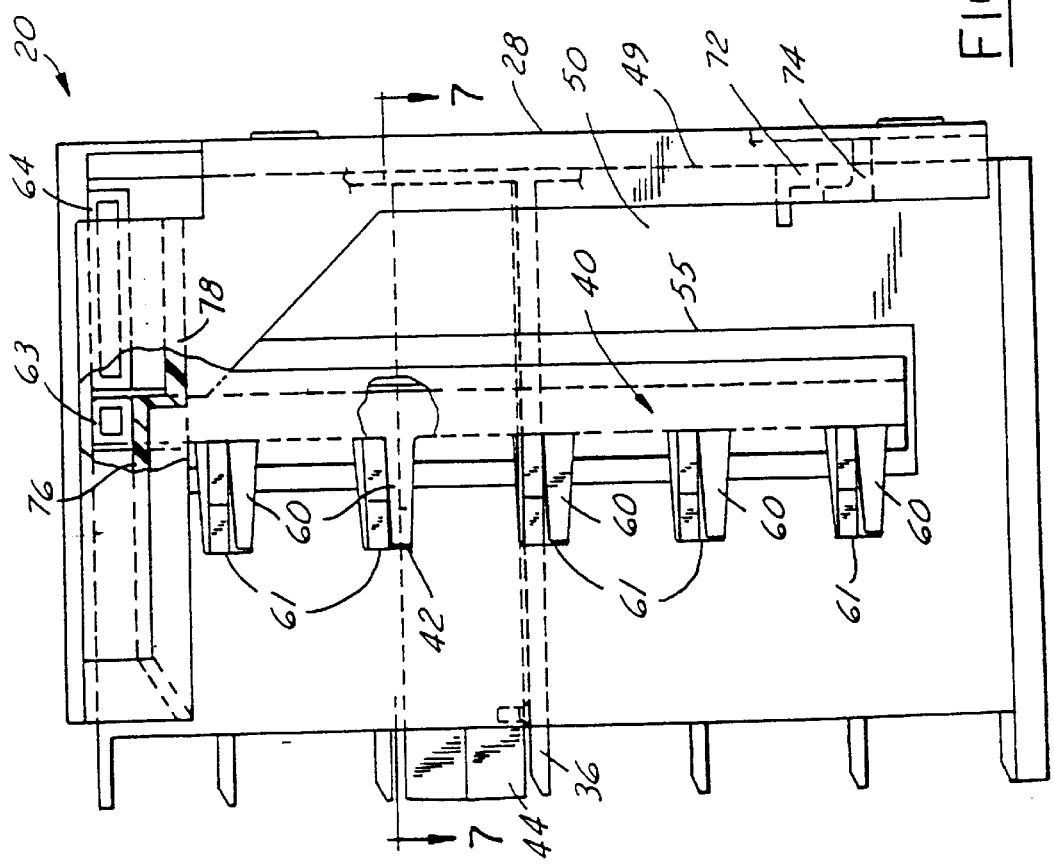
FIG. 6 shows a side view of the receiver and magazine assembly of FIG. 2 with the locking member in the locked position.

Referring now to FIGS. 6–8, when magazine 24 is disposed within receiver 22, spring 56 biases locking member 40 to a locked position prior to the magazine longitudinally moving downward with respect to the receiver. Spring 56 biases locking member 40 to the locked position by exerting a longitudinal force between top portion 46 of magazine 24 and platform 58 of the locking member. In the locked position, bent portions 62 of fingers 60 cooperate with notches 42 in cartridges 44 for securing the cartridges in the respective cells 36.

As shown, upper ledge 76 of actuator member 38 holds boss 63 of locking member 40 in place in guide channel 68. Tabs 72 of side portions 50 and 52 are longitudinally displaced from slots 74 of legs 30 and 32. Similarly, guide track 64 is longitudinally displaced from lower ledge 78 of guide channel 68.

Figure 9:
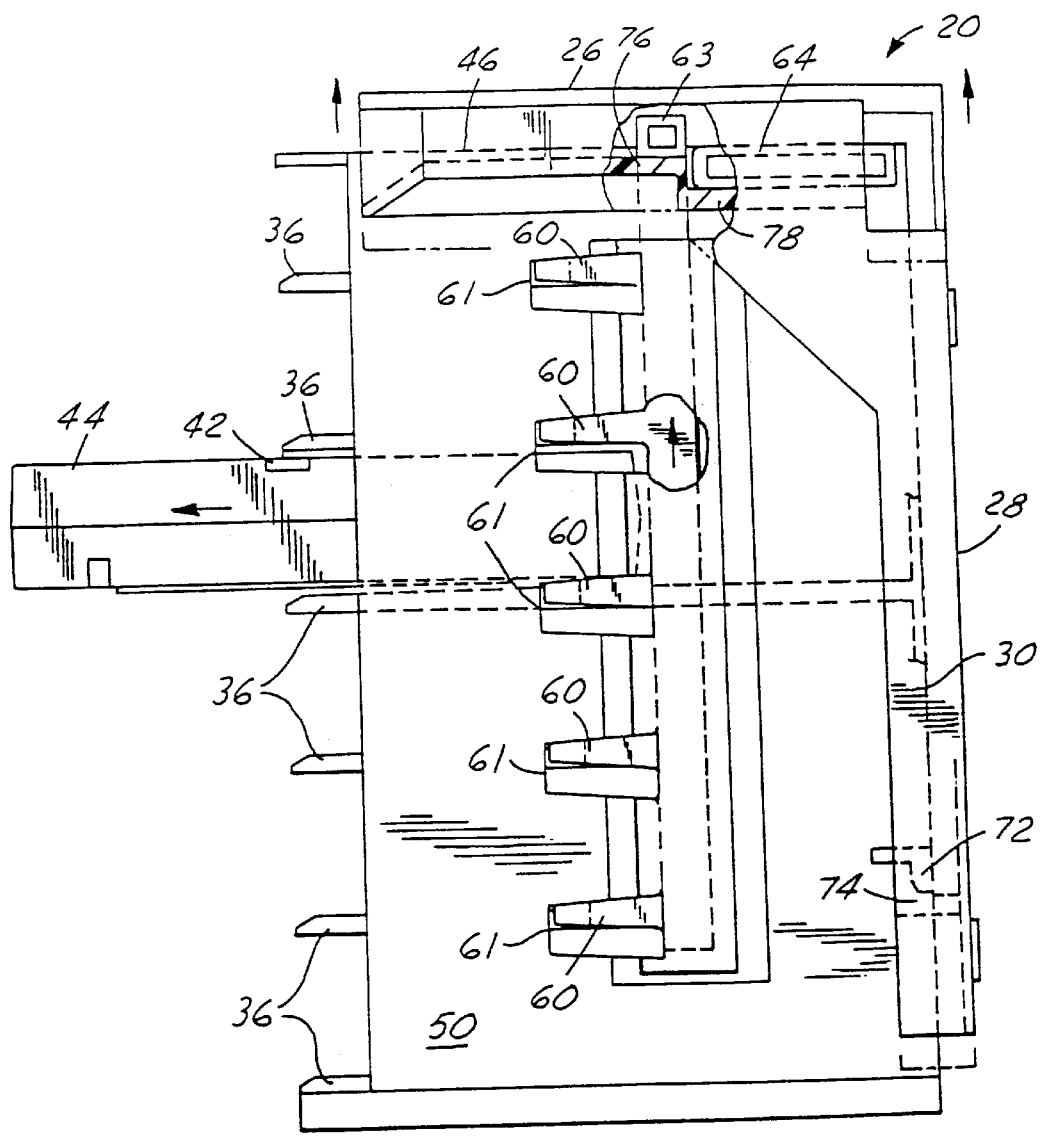
FIG. 9 shows a side view of the receiver and magazine assembly of FIG. 2 with the locking member in the unlocked position.
Figure 10:
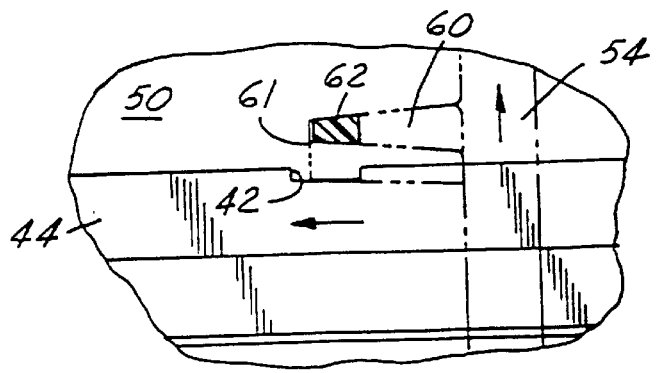
FIG. 10 shows a finger of the locking member disengaged from a notch of a cartridge to unlock the cartridge from a cell of the magazine.

Referring now to FIGS. 9–10, when magazine 24 is disposed within receiver 22 and then moves longitudinally downward with respect to the receiver, actuator member 38 and locking member 40 are operative to disengage fingers 60 from the respective cartridge notch 42 for unlocking the cartridges for access. Specifically, upper ledge 76 holds boss 63 in place in guide channel 68 as magazine 24 longitudinally moves downward with respect to receiver 22. By holding boss 63, and consequently, latch 54, in place, magazine 24 also moves longitudinally downward with respect to the latch. Accordingly, cartridges 44 within cells 36 move downward with respect to fingers 60, causing bent portions to release engagement with notches 42 of the respective cartridges. As a result, cartridge 44 can be slid out of cell 36 as shown.

Once magazine 24 is inserted into receiver 22, the weight of the magazine causes the magazine to move longitudinally downward with respect to the receiver, thereby automatically unlocking cells 36. As magazine 24 moves downward, spring 56 stretches between top portion 46 of magazine 24 and platform 58 of locking member 40. Magazine 24 stops moving downward once tabs 72 of the magazine bottom out in slots 74 of receiver 22. At this point, guide tracks 64 and 66 of magazine 24 rest on lower ledges 78 of guide channels 68 and 70 of receiver 22.

Returning to FIGS. 2–3, the spring-bias provided by spring 56 also causes locking member 40 to return to the locked position as magazine 24 moves longitudinally upward with respect to receiver 22, thereby automatically locking any cartridges within cells 36 as the magazine is removed from the receiver.

Thus it is apparent that there has been provided, in accordance with the present invention, a storage library system that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A storage library system for storing cartridges, the system comprising:
   a receiver forming an opening therein and including an actuator member; and
   a magazine adapted for engagement within the receiver opening and having a plurality of cells formed therein for receiving the cartridges, wherein the magazine includes a locking member engageable with the actuator member to hold the locking member longitudinally in place between locked and unlocked positions with respect to the cartridges for automatically locking and unlocking the cartridges in each of the plurality of cells as the magazine and the cartridges are longitudinally moved with respect to the receiver and the locking member.

2. The system of claim 1 wherein:

the receiver includes a guide channel and the actuator member includes an upper ledge formed within the guide channel.

the magazine includes an opening formed therethrough at each cell for receiving the fingers.

3. The system of claim 2 wherein:

the locking member includes a spring-biased, longitudinally slidable latch with a plurality of fingers extending therefrom for cooperation with the cartridges positioned in the plurality of cells, and the locking member further includes a boss at an end of the latch for engaging the upper ledge of the actuator member in the guide channel for holding the latch as the magazine is moved longitudinally with respect to the receiver for locking and unlocking of the cartridges.

4. The system of claim 3 wherein:

the magazine includes an opening formed therethrough at each cell for receiving the fingers.

5. The system of claim 1 wherein:

the magazine includes a guide track extending therefrom, and the receiver includes a guide channel for receiving the guide track.

6. A storage library system for storing cartridges, each cartridges having a notch formed therein, the system comprising:

a receiver forming an opening therein and including an actuator member, the receiver further includes a guide channel and the actuator member includes an upper ledge formed within the guide channel; and a magazine adapted for engagement within the receiver opening and having a plurality of cells formed therein for receiving the cartridges, wherein the magazine includes a locking member engageable with the actuator member to hold the locking member between locked and unlocked positions with respect to the notch of each cartridge for automatically locking and unlocking the cartridges in each of the plurality of cells as the magazine is longitudinally moved with respect to the receiver;

wherein the locking member includes a spring-biased, longitudinally slidable latch provided with a plurality of fingers extending therefrom for cooperation with the respective notches of each of the cartridges positioned in the plurality of cells.

7. The system of claim 6 wherein:

the locking member further includes a boss at an end of the latch for engaging the upper ledge of the actuator member in the guide channel for holding the latch as the magazine is moved longitudinally with respect to the receiver for locking and unlocking of the cartridges.

8. The system of claim 7 wherein:

the locking member includes an opening formed therethrough at each cell for receiving the fingers.

9. The system of claim 6 wherein:

the magazine includes a guide track extending therefrom, and the receiver includes a guide channel for receiving the guide track.

10. A storage library system for storing cartridges, each cartridge having a notch formed therein, the system comprising:

a receiver forming an opening therein and including a guide channel and an actuator member containing an upper ledge formed within the guide channel; and a magazine adapted for engagement within the receiver opening and having a plurality of cells formed therein for receiving the cartridges, wherein the magazine includes a spring-biased, longitudinally slidable latch for automatically locking and unlocking the cartridges in each of the plurality of cells as the magazine is longitudinally moved with respect to the receiver, and wherein the latch is provided with a plurality of fingers extending therefrom for cooperation with the respective notches of each of the cartridges positioned in the plurality of cells, and a boss at an end of the latch for engaging the upper ledge of the actuator member in the guide channel for holding the latch as the magazine is moved longitudinally with respect to the receiver for locking and unlocking of the cartridges.

* * * * *